US009300242B2

(12) United States Patent
Jefferies et al.

(10) Patent No.: US 9,300,242 B2
(45) Date of Patent: Mar. 29, 2016

(54) NONVOLATILE THERMAL MEMORY METHOD AND APPARATUS FOR ELECTRONIC OVERLOAD RELAY

(71) Applicant: Schneider Electric USA, Inc., Palatine, IL (US)

(72) Inventors: Kevin M. Jefferies, Raleigh, NC (US); Milton Hotard, Knightdale, NC (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 613 days.

(21) Appl. No.: 13/727,255

(22) Filed: Dec. 26, 2012

(65) Prior Publication Data

US 2014/0180611 A1    Jun. 26, 2014

(51) Int. Cl.
| | |
|---|---|
| *H02H 7/09* | (2006.01) |
| *G01K 1/08* | (2006.01) |
| *H02P 29/00* | (2006.01) |
| *H02P 29/02* | (2006.01) |
| *H02H 6/00* | (2006.01) |
| *H02H 7/08* | (2006.01) |

(52) U.S. Cl.
CPC ............ *H02P 29/0044* (2013.01); *H02H 6/005* (2013.01); *H02P 29/02* (2013.01); *H02H 7/08* (2013.01)

(58) Field of Classification Search
CPC ......... H02P 1/26; H02P 1/16; H02P 23/0072; H02P 29/0044; H02P 29/02; H02H 7/0822; H02H 6/005; H02H 7/08
USPC .......... 702/58, 60, 61, 64, 132; 318/103, 778; 361/24
See application file for complete search history.

(56) References Cited

U.S. PATENT DOCUMENTS

| | | | |
|---|---|---|---|
| 5,206,572 A * | 4/1993 | Farag et al. | ................... 318/778 |
| 5,448,442 A * | 9/1995 | Farag | .............................. 361/24 |
| 5,617,078 A | 4/1997 | Durif et al. | |
| 5,644,510 A | 7/1997 | Weir | |
| 5,850,330 A | 12/1998 | Perron et al. | |

FOREIGN PATENT DOCUMENTS

EP           0075296      3/1983

OTHER PUBLICATIONS

International Search Report of International Application No. PCT/US2013/077146—Date of Completion of Search: Mar. 19, 2014—3 pages.

PCT Written Opinion of the International Searching Authority for International Application No. PCT/US2013/077146—Date of Completion of Search: Mar. 19, 2014—6 pages.

English Language Machine Translation of European Patent Publication No. EP0075296—10 pages.

* cited by examiner

*Primary Examiner* — John H Le
(74) *Attorney, Agent, or Firm* — Locke Lord LLP

(57) ABSTRACT

An electronic overload relay includes a microcontroller having an internal random-access memory (RAM) in which a motor thermal model is stored. The microcontroller is coupled to a power supply having a bulk storage capacitor. In response to a trip or stop condition of a protected motor, the thermal model is maintained in the RAM with no timing or decrementing. When the motor restarts, the microcontroller calculates a change in capacitor voltage to estimate the motor stop duration. The thermal model is decremented based on the estimated duration.

20 Claims, 5 Drawing Sheets

NONVOLATILE THERMAL MEMORY METHOD AND APPARATUS FOR ELECTRONIC OVERLOAD RELAY

FIELD OF THE INVENTION

This invention is directed generally to electrical systems, and, more particularly, to a method in which motor temperature is monitored based on capacitor information stored in a volatile memory.

BACKGROUND OF THE INVENTION

Motor overload relays attempt to model motor heating based on information related to motor operating parameters. Commonly, electronic overload relays monitor motor currents to model heating in the motor stator and rotor based on a thermal model that relates the motor currents to heat generation.

One type of electronic overload relay is a self-powered device. In this type of device, current sensors that provide current measurement information also provide the power to operate the device. By being self-powered, if the motor currents are removed, the overload relay device loses the operating power provided by the current measurement sensors. Motor currents are removed, for example, if the motor is stopped by a control system or if the overload relay "trips" to protect the motor from an undesirable operating condition. Self-powered devices operate on stored energy for the duration of the motor stop, and even during normal operation these devices have a generally low power supply budget.

The relationship between the physical size of materials required in the current sensors, which contributes to the cost of the current sensors, and the operating power available from the sensors, drives a lower operating power budget in self-powered devices. Because the same sensors are used to measure current and derive operating power, increasing power draw from the sensors causes decreased measurement accuracy. In turn, this provides further impetus to maintain a low operating power level.

During the motor stop, when the device is in an unpowered state, it is still necessary to maintain the motor thermal model such that when the motor is restarted the overload protection does not assume that the motor is starting cold (or from an initial unheated state). This function of the overload relay thermal model is called the thermal memory of the device. Some standards, such as National Electrical Manufacturers Association (NEMA) ICS-2, provide requirements for the performance of the thermal memory and create a distinction between volatile and nonvolatile thermal memory based on the characteristics of the function.

Nonvolatile thermal memory means that, following a motor stop of some duration, the motor protection overload relay maintains some thermal memory from the motor thermal model prior to the stop condition. In general, nonvolatile thermal memory is desirable compared to volatile thermal memory because nonvolatile thermal memory maintains the thermal model of the motor during a longer duration stop.

Beyond maintaining the thermal model during the unpowered state, it is also beneficial for the thermal memory function to decrease, when the motor is restarted, the thermal model value based on the duration of the motor stop and to take into account the cooling of the motor by heat dissipation. Existing implementations fail to properly account for motor heat dissipation. For example, existing implementations do not adequately address the low operating power budget available to self-powered devices. In another example, existing implementations also require additional circuitry that otherwise would not be required for operating the device and that only functions to implement the thermal memory method.

What is needed is a low cost implementation of the function of a nonvolatile thermal memory.

SUMMARY OF THE INVENTION

In an implementation of the present invention, an electronic overload relay includes a microcontroller having a volatile internal or external volatile memory (e.g., random-access memory ("RAM")) in which a motor thermal model is stored. The microcontroller and RAM is coupled, via a supply circuit, to a power supply having a bulk storage capacitor. In response to a trip or stop condition of a protected motor, the thermal model is maintained in the RAM by energy stored in the bulk storage capacitor with no timing or decrementing. When the motor restarts, the microcontroller uses an algorithm to calculate a change in capacitor voltage to estimate the motor stop duration. The thermal model is decremented based on the estimated duration. As such, a nonvolatile thermal memory characteristic is attained for the electronic overload relay using a supply circuit, a microcontroller volatile memory (e.g., RAM), and the algorithm and associated data.

In another implementation of the present invention, a method is directed to protecting a motor with an electronic overload relay. The overload relay includes a power supply having a capacitor and a microcontroller having a volatile memory. The method includes, during an initial powered state of the motor, using the microcontroller for (a) monitoring a supply voltage to the capacitor, and (b) storing in the volatile memory an initial value of a motor thermal model. In response to the motor entering an unpowered state, the monitoring of the supply voltage to the capacitor is discontinued. Then, upon entering a subsequent powered state of the motor, the microcontroller (c) determines a change in capacitor voltage, (d) retrieves the stored value from the volatile memory and (e) based in part on the change in capacitor voltage, adjusts the stored value to a modified value of the thermal model.

In another alternative implementation of the present invention, an electronic overload relay is directed to monitoring a motor thermal model and includes a current transformer having an overvoltage protection circuit and a power supply with a capacitor. The electronic overload relay further includes a processor and a volatile memory device. The volatile memory devices stores instructions that, when executed by the processor, cause the electronic overload relay to monitor a supply voltage to the capacitor during a powered state and store an initial value of the motor thermal model. In response to entering an unpowered state, the monitoring is discontinued. Upon resuming the powered state, the initial value is adjusted to a modified value based in part on a change in capacitor voltage.

In another alternative implementation of the present invention, a computer program product includes one or more non-transitory tangible media having a computer readable program logic embodied therein. The computer readable program logic is configured to be executed to implement a method for protecting a motor with an electronic overload relay. The overload relay includes a power supply having a capacitor and a microcontroller having a volatile memory. The method includes monitoring a supply voltage to the capacitor during a first powered state of the protected motor, and storing an initial thermal value of a motor thermal model and an initial capacitor voltage. In response to the motor entering an unpowered state, the monitoring of the supply voltage is discontinued. In response to the motor entering a second powered state, subsequent to the unpowered state, a determination is made for (a) a change in capacitor voltage between the first powered state and the second powered state and (b) a discharge rate of the capacitor. Duration of the unpowered state is calculated based on the change in capacitor voltage and on the discharge rate of the capacitor. The initial thermal value is adjusted to a modified thermal value based on the duration.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Figure 1:
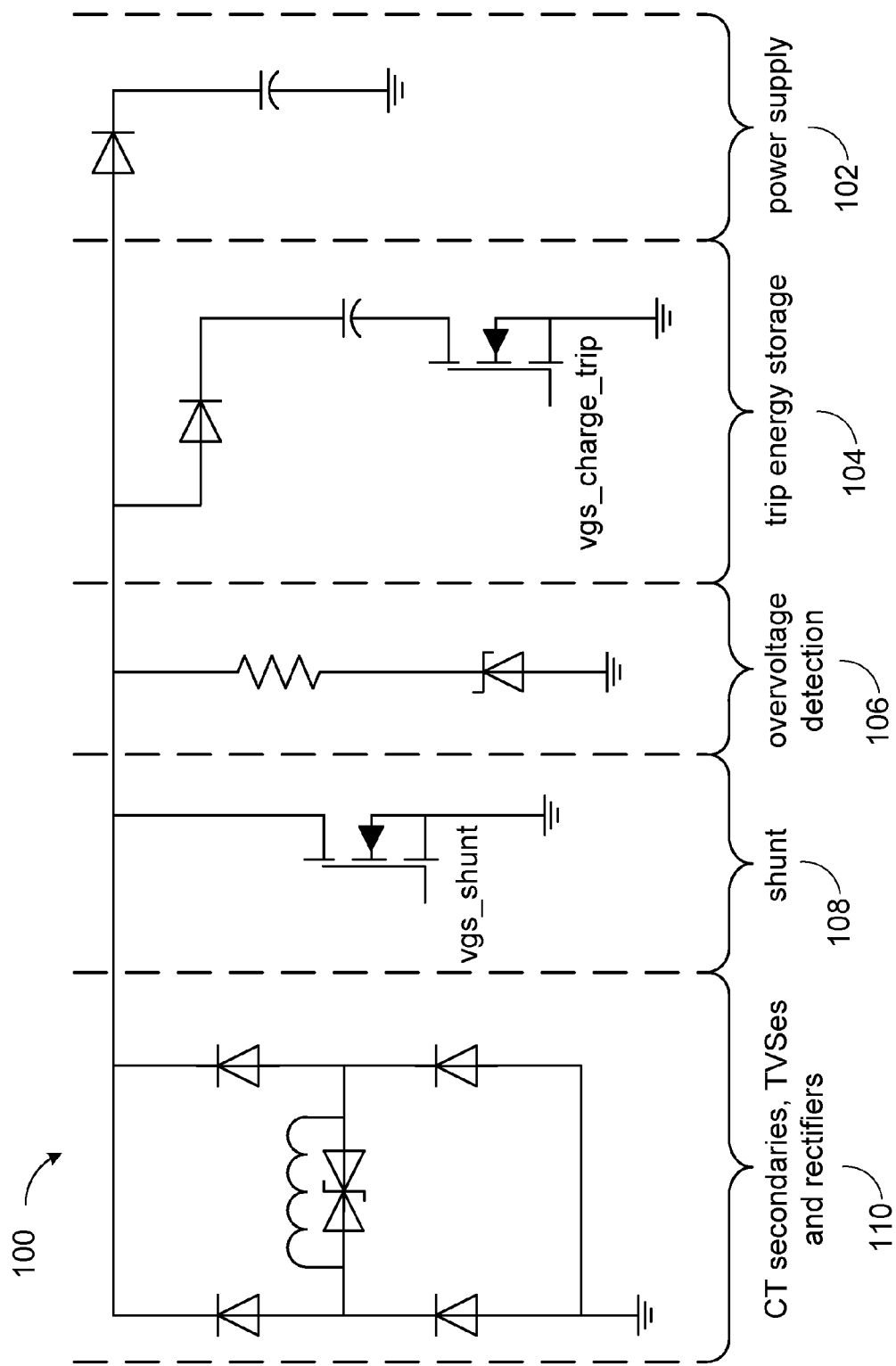
FIG. 1 is a circuit diagram showing a prior-art power supply scheme for a current transformer with an overload relay.

Referring to FIG. 1, a known current transformer 100 includes a power supply 102, a trip energy storage 104, an overvoltage detection device 106, a shunt 108, current transformer secondaries, transient-voltage suppressors (TVSes) and rectifiers 110, etc. This type of current transformer 100 includes a typical overload relay power supply topology. However, as discussed above, this type of current transformer 100 fails to provide a low cost implementation of a nonvolatile thermal memory suitable for an overload relay device. Such current transformer would require, for example, additional circuitry to implement the thermal memory.

Figure 2:
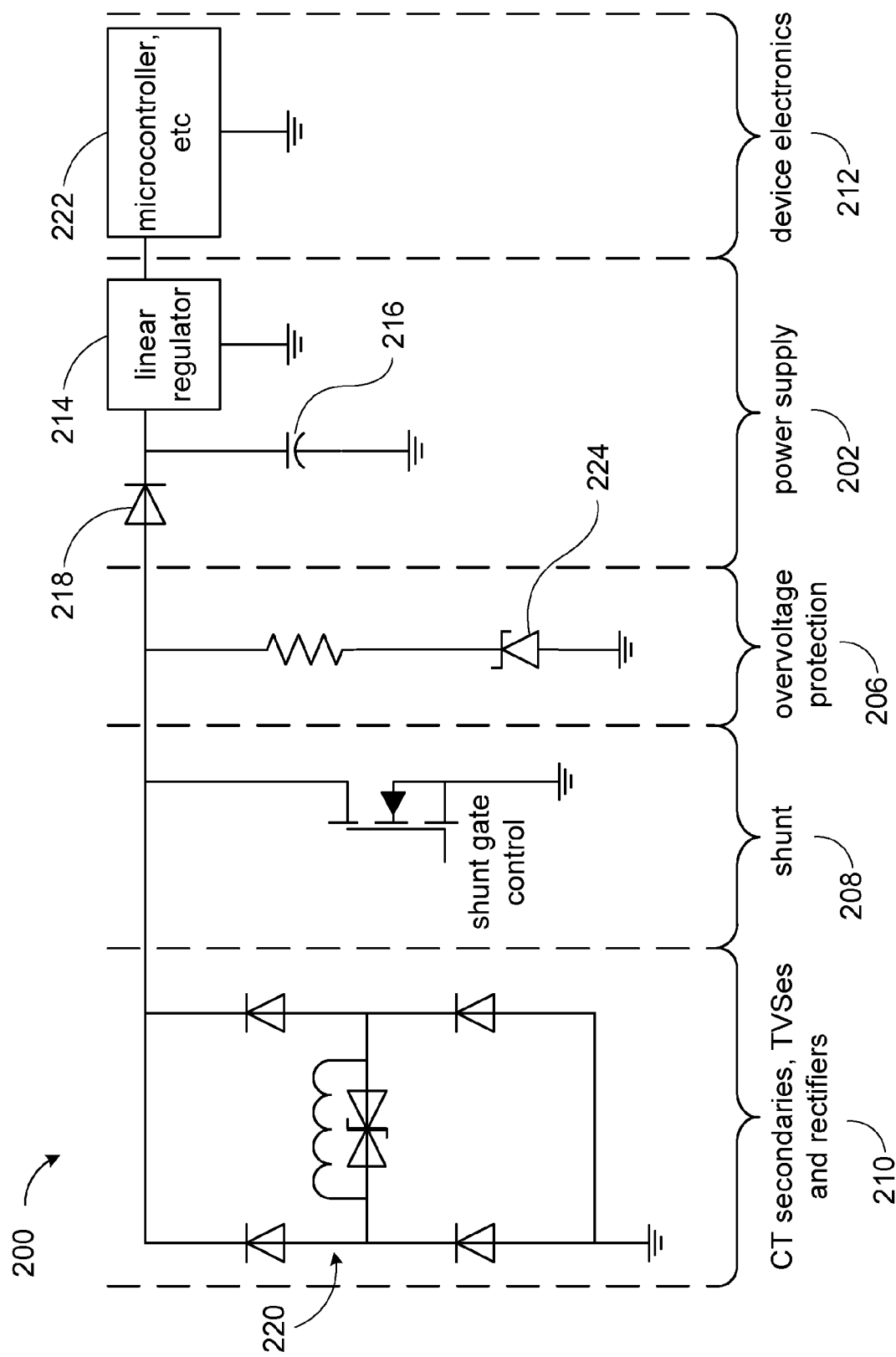
FIG. 2 is a circuit diagram showing a power supply scheme for a self-powered electronic overload relay.

Referring to FIG. 2, a self-powered electronic overload relay 200 includes a power supply 202, an overvoltage protection device 206, a shunt device 208, current transformer secondaries, transient-voltage suppressors (TVSes), and rectifiers 210 (also referred to as current transformer ("CT") output 210), and device electronics 212. The device electronics 212 are provided with a stable power supply voltage, via the power supply 202, from the output of a voltage regular such as a low dropout linear voltage regulator 214. The input of the linear regulator 214 is connected to a power supply capacitor 216, which stores sufficient energy to maintain the input voltage to the linear regulator 214 during supply regulation and while allowing the output of the linear regulator 214 to remain stable.

The power supply 202 is diode coupled to a supply node 218. Electrical current is supplied into the supply node 218 from current transformer secondaries 210 that power the relay device 200 and that are connected through a diode rectifier 220. Following the closed circuit loop, current returns to the current transformers through either the power supply 202 and device electronics 212, or through additional electronics that regulate the voltage of the power supply capacitor 216.

Output of the current transformer secondaries 210 may be controlled using a shunting-type power supply regulation scheme in which the shunt device 208 steers current between the power supply capacitor 216 and a direct return path to the current transformer secondaries 210. The shunting operation may be controlled by a microcontroller 222 of the device electronics 212. The microcontroller 222 can be one or more processors. The power supply voltage may also be clamped by the overvoltage protection device 206, which can include, for example, a zener diode 224 or a transient voltage suppressor.

The microcontroller 222 monitors voltage of the supply capacitor 216 to control regulation of the voltage via the shunt device 208, which may include a shunt transistor. Specifically, the microcontroller 222 maintains the supply voltage within some nominal range based on voltage limits and needs of the components in the circuit of the overload relay 200. The voltage supply regulation is controlled by the microcontroller 222 to avoid requiring additional external components such as comparators or operational amplifiers, which would otherwise be required to regulate the supply voltage outside the microcontroller 222.

Figure 3:
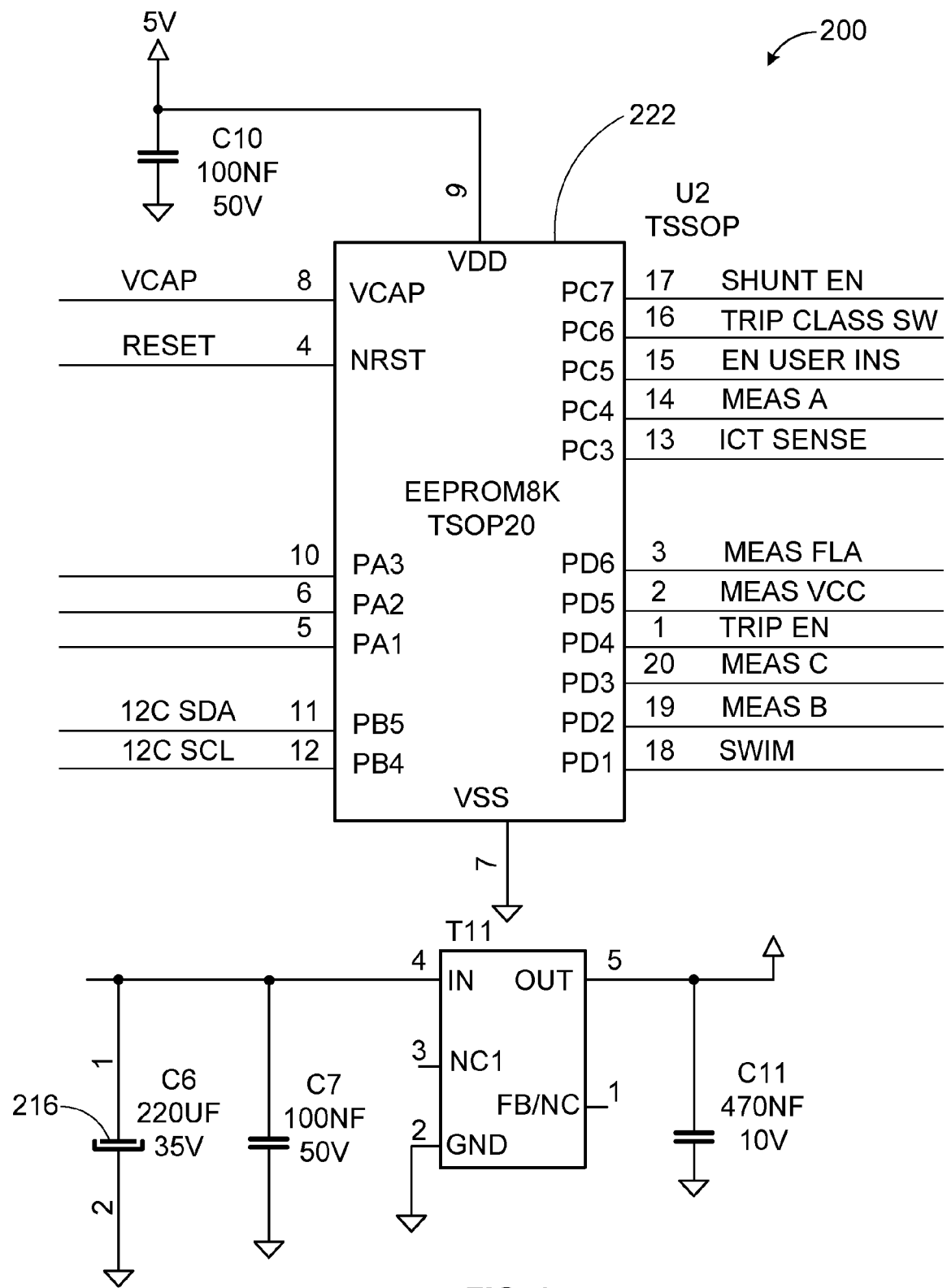
FIG. 3 is a diagrammatic illustrating a microcontroller with nonvolatile thermal memory for an electronic overload relay.

Referring to FIG. 3, the microcontroller 222 of the overload relay device 200 has an internal motor thermal model that is described in more detail below. The microcontroller 222 is communicatively coupled to the capacitor 216, which functions as a bulk storage capacitor for the power supply 202 of the microcontroller 222. The microcontroller 222 has a volatile memory that maintains the thermal model after a trip or stop condition of the protected motor. Then, when the motor restarts, the microcontroller 222 uses a change in capacitor voltage to estimate the motor stop duration and, based on the estimated duration, decrement the thermal model. According to one example, the volatile memory is an internal random-access memory (RAM).

Based on the maintained thermal model, no timing or decrementing is required. Furthermore, by storing a value of the thermal model in RAM there is no need to store the thermal model value in a nonvolatile memory, such as flash memory or electrically-erasable programmable read-only memory (EEPROM). Storing the value of the thermal model in nonvolatile memory would be detrimental because it would require additional time and power to write to the memory and, further, would impose additional constraints on the choice of processor/microcontroller.

Figure 4:
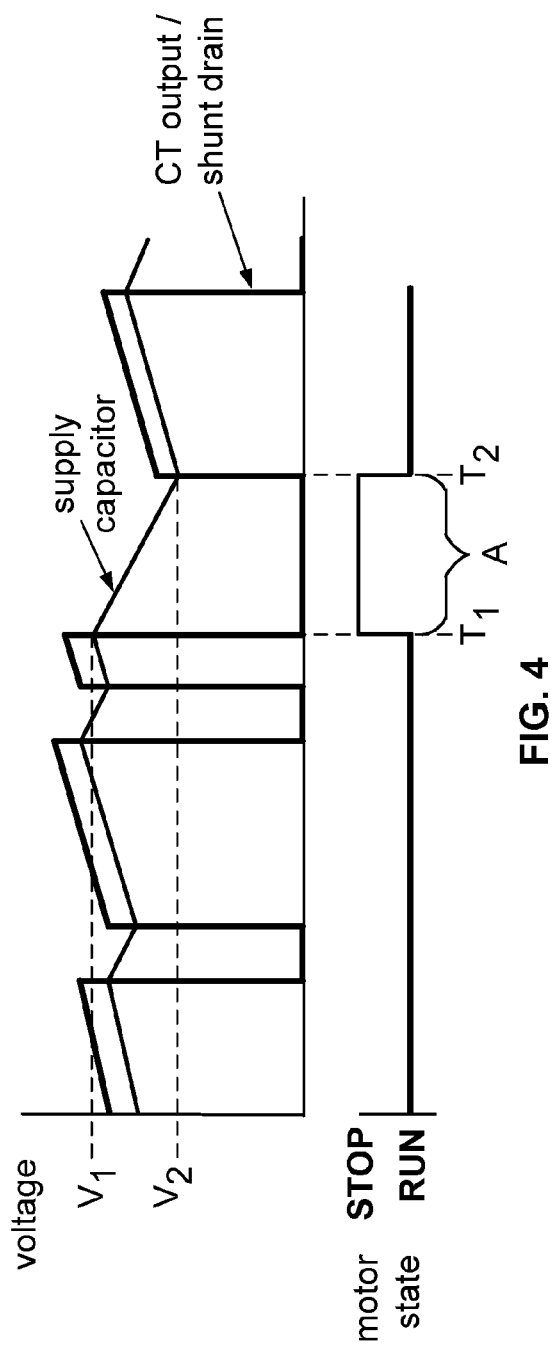
FIG. 4 is a timing diagram showing the operation of a power supply scheme, shunt control, and power supply voltage during normal operation of an electronic overload relay.

Referring to FIG. 4, a timing diagram shows the general operation of the power supply scheme, shunt control, and power supply voltage during normal operation of the overload relay device 200. When the microcontroller 222 controls the shunt transistor 208 to an OFF state in which the motor is in a STOP state, the voltage of the power supply capacitor 216 increases, coupled through diode 218 as shown from the node of the circuit connected to the CT output 210 and shunt drain. When the microcontroller 222 controls the shunt transistor 208 to an ON state in which the motor is in a RUN state, the power supply capacitor 216 discharges by providing current (e.g., currents Q1 and Q2 illustrated in FIG. 5) to the power supply 214 and to the device electronics 212 including the microcontroller 222. The microcontroller 222 controls the state of the shunt transistor 208 in this manner to regulate the voltage of the monitored power supply capacitor 216 within the nominal range of the device.

During the motor stop A, the voltage of the capacitor 216 decreases from a first voltage V1 to a second voltage V2. Based on the difference ΔV between the two voltages V1, V2, and on a capacitor discharge rate, the microcontroller 222 determines the motor stop duration. Although the change in voltage ΔV is illustrated as a linear and constant change, it is understood that in other examples the change may be variable.

Figure 5:
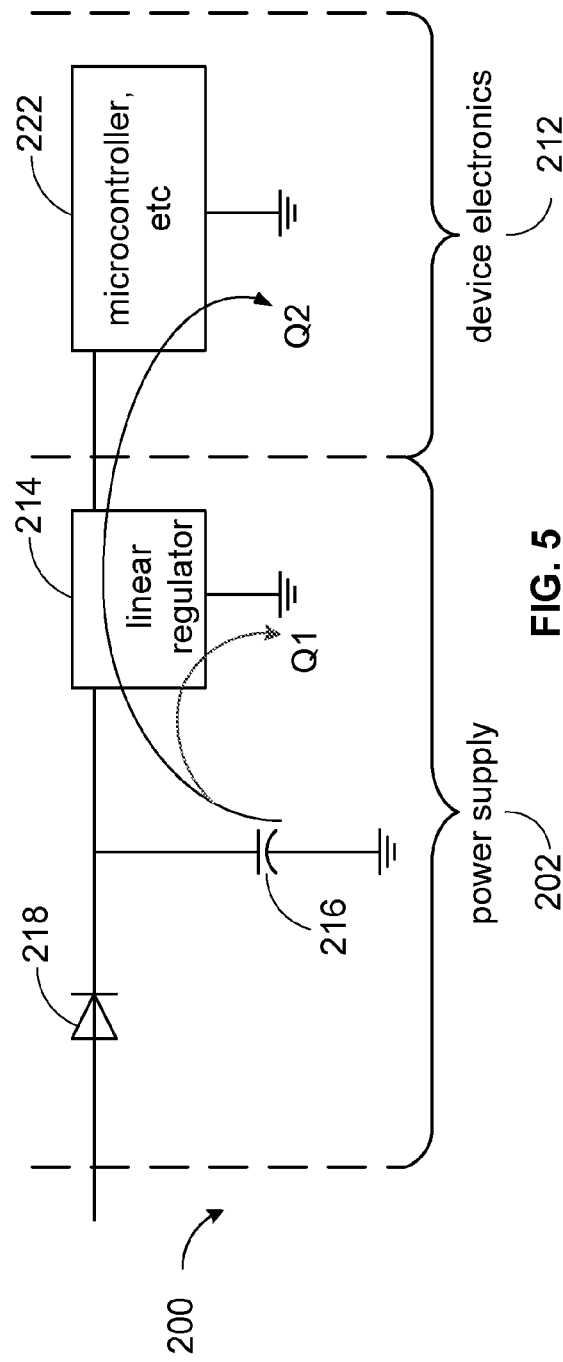
FIG. 5 is a diagrammatic illustrating discharge paths of capacitor current.

Referring to FIG. 5, during the duration of the motor stop (e.g., motor stop A in FIG. 4), the microcontroller 222 enters a low power operating mode and discontinues processing any instructions. This avoids the need for any special external components, such as a low frequency oscillator. While the microcontroller 222 is in the low power operating mode, the power supply capacitor 216 is discharged through (a) internal leakage and (b) quiescent current of the linear regulator 214, the microcontroller 222, and any other device electronics 212 that remain powered. For example, quiescent current Q1 is caused by the linear regulator 214 and quiescent current Q2 is caused by the microcontroller 222. These leakage and quiescent currents define the discharge rate of the capacitor 216.

At the end of the motor stop, the microcontroller 222 resumes program execution, still retaining in RAM the previous value for the motor thermal model. The previous value is the value stored in RAM prior to the motor stop. For example, the microcontroller 222 retains in RAM a value of the motor thermal model associated with the first voltage V1 prior to the motor stop A (illustrated in FIG. 4). Because the motor dissipates heat and cools while stopped, it is desirable to adjust the thermal model value based on the stop duration. As the duration of the motor stop increases, the amount of heat dissipated during the stop and the available motor thermal capacity increases.

To determine the duration of the motor stop and to allow adjustment of the stored thermal model, stop duration is measured based on the voltage of the supply capacitor 216. As such, the function of the microcontroller 222 of measuring the voltage of the supply capacitor 216 is re-used to avoid added cost in components for the overload relay device 200.

The microcontroller 222 calculates the duration of the motor stop based on the change in voltage ΔV (e.g., V1-V2) of the capacitor 216 and the rate of discharge of the capacitor 216. Depending on the characteristics of the electronics in the overload relay device 200 the discharge rate can be assumed to be constant, resulting in a linear equation for determining the motor stop duration. The discharge rate calculation can, further, take into account variable discharge rates, such as dependence on linear regulator quiescent current, resulting in a non-linear capacitor discharge rate. In another example, the microcontroller 222 can further take into account the operating temperature of the overload relay device 200 to adjust the calculated motor stop duration for variability of the quiescent and leakage currents over temperature.

The microcontroller 222 decrements the thermal model to compensate for cooling of the motor during the motor stop based on the calculated motor stop duration. The following pseudo-code illustrates a general example of decrementing the thermal model based on the calculated motor stop duration:

```
//SUPPLY_BEFORE_STOP is the supply voltage prior to the motor stop
//SUPPLY_AFTER_STOP is the supply voltage after the motor stop
//THERMAL_MODEL_VALUE is the value of the motor thermal model
//SUPPLY_SCALE is a scaling factor proportional to the full scale
  sample value of the supply voltage
SUPPLY_VOLTAGE_DELTA = SUPPLY_BEFORE_STOP −
SUPPLY_AFTER_STOP;
THERMAL_MODEL_VALUE =1 − SUPPLY_VOLTAGE_DELTA /
SUPPLY_SCALE;
```

Benefits provided by the overload relay device 200 include that there is no need for (a) a special timing circuit or external thermal model capacitors, (b) a low-speed oscillator for microcontroller timing, (c) or other dedicated components to determining the motor stop duration. The overload relay device 200 includes a simple circuit with a firmware algorithm that can estimate off-time duration of the motor stop and can adjust decrementing based on trip class settings. Thus, by knowing the supply voltage of the capacitor 216, the microcontroller 222 can adjust the value of the thermal model of the protected motor.

The microcontroller 222 can be used in any device that require modeling of heating based on monitored signals (e.g., current, voltage, etc.) and that can benefit from implementing a memory of the protection functions and from adjusting the memory based on a duration in an unpowered (or stop) state. For example, the microcontroller 222 can be used in circuit breakers and/or motor circuit protectors.

Figure 6:
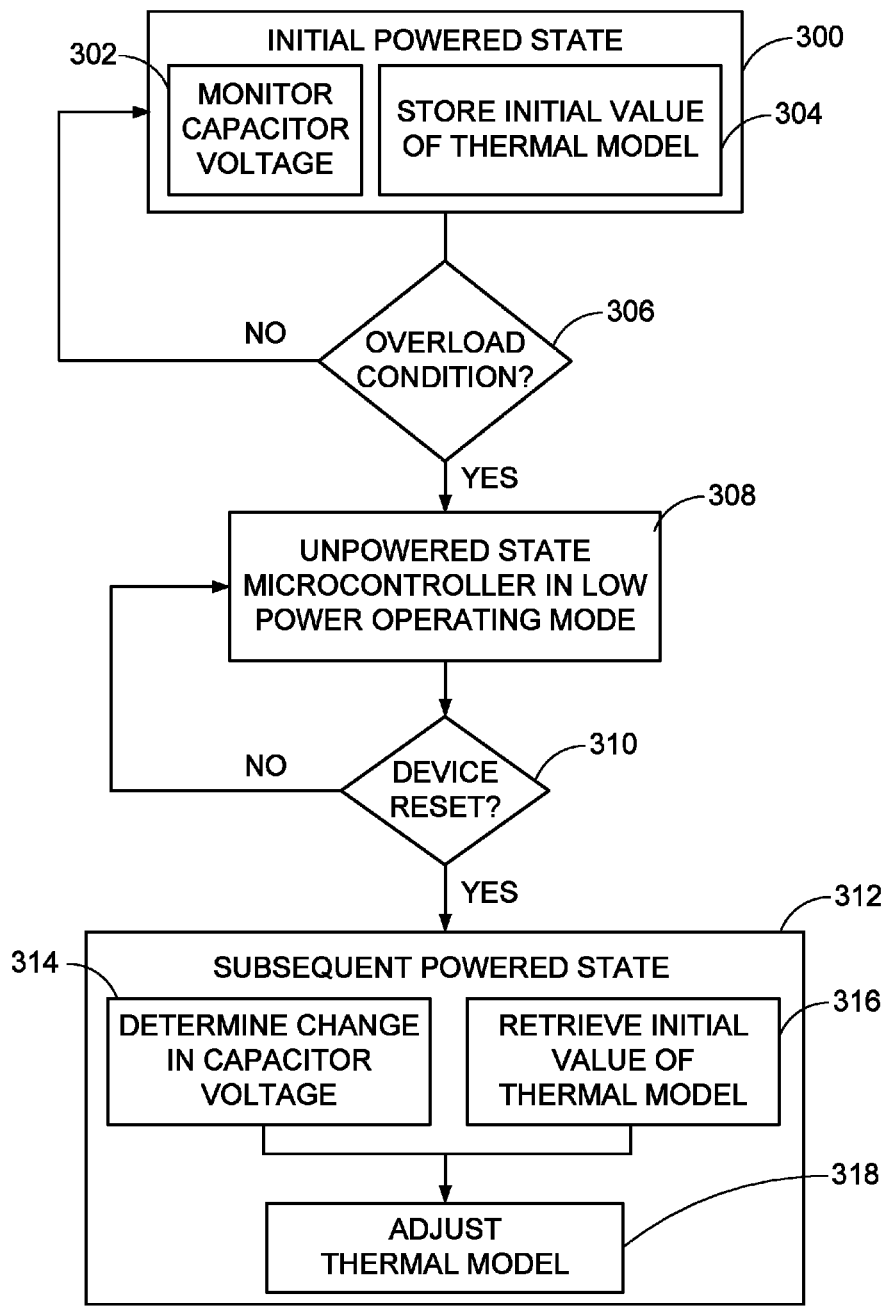
FIG. 6 is a flowchart illustrating a method of protecting a motor with an electronic overload relay device.

Referring to FIG. 6, a method is directed to protecting a motor with an electronic overload relay device, which includes a microcontroller having a nonvolatile memory. The motor is in an initial powered state at 300, during which the microcontroller is in a normal operating mode. In the normal operating mode the microcontroller monitors capacitor voltage at 302 and stores an initial value of the motor thermal model at 304. The storing of the initial value can occur at predetermined time intervals such that the initial value is frequently being updated during the initial powered state.

If an overload condition occurs at 306, the motor enters an unpowered state and the microcontroller enters in a low power operating mode at 308. During this state, the microcontroller discontinues the monitoring of supply voltage to the capacitor.

Then, if the overload relay device is reset at 310, the motor enters a subsequent powered state at 312 in which the microcontroller resumes its normal operating mode. Furthermore, the microcontroller determines a change in capacitor voltage at 314, retrieves the initial value of the thermal model at 316, and adjusts the thermal model at 318 by changing the initial value to a modified value. According to one example, the initial value is decremented to compensate for cooling of the motor during the unpowered state.

Any of the methods described herein can include machine or computer readable instructions for execution by: (a) a processor, (b) a controller, such as the microcontroller 222, and/or (c) any other suitable processing device. It will be readily understood that the overload relay device 200 can include such a suitable processing device. Any algorithm, software, or method disclosed herein can be embodied as a computer program product having one or more non-transitory tangible medium or media.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of protecting a motor with an electronic overload relay, the overload relay including a power supply having a capacitor and a microcontroller having a volatile memory, the method comprising:
during an initial powered state of the motor, using the microcontroller for
(a) monitoring a supply voltage to the capacitor, and
(b) storing in the volatile memory an initial value of a motor thermal model;
in response to the motor entering an unpowered state, discontinuing the monitoring of the supply voltage to the capacitor; and
upon entering a subsequent powered state of the motor, using the microcontroller for
(c) determining a change in capacitor voltage,
(d) retrieving the stored value from the volatile memory and
(e) based in part on the change in capacitor voltage, adjusting the stored value to a modified value of the thermal model.

2. The method of clam 1, further comprising using the microcontroller for determining a motor stop duration based on the change in capacitor voltage.

3. The method of claim 1, wherein the motor enters the unpowered state in response to the microcontroller detecting an overload condition.

4. The method of claim 1, wherein the volatile memory is internal random-access memory (RAM) of the microcontroller.

5. The method of claim 1, wherein, in the unpowered state, the microcontroller enters a low power operating mode and discontinues processing any instructions.

6. The method of claim 1, wherein the modified value is further determined based on a discharge rate of the capacitor.

7. The method of claim 6, wherein the discharge rate of the capacitor is defined by (i) internal leakage current of the capacitor and (ii) quiescent currents of the microcontroller and other electrically coupled components that remain powered in the unpowered state.

8. The method of claim 6, wherein the discharge rate of the capacitor is constant.

9. The method of claim 1, wherein the adjusting includes decrementing the initial value to compensate for cooling of the motor during the unpowered state.

10. An electronic overload relay for monitoring a motor thermal model, the overload relay comprising:
a current transformer having an overvoltage protection circuit and a power supply with a capacitor;
a processor; and
a volatile memory device storing instructions that, when executed by the processor, cause the electronic overload relay to
monitor a supply voltage to the capacitor during a powered state,
store an initial value of a motor thermal model,
discontinue, in response to entering an unpowered state, to monitor the supply voltage to the capacitor, and
upon resuming the powered state, adjust the initial value to a modified value based in part on a change in capacitor voltage.

11. The electronic overload relay of claim 10, wherein the volatile memory device is internal memory of the processor.

12. The electronic overload relay of claim 10, wherein the volatile memory device further stores instructions that, when executed by the processor, cause the electronic overload relay to detect an overload condition that causes the unpowered state.

13. The electronic overload relay of claim 10, wherein the processor enters a low power operating mode in the unpowered state.

14. The electronic overload relay of claim 10, wherein the modified value is further determined based on a discharge rate of the capacitor, the discharge rate being defined by (i) internal leakage current of the capacitor and (ii) quiescent currents of the processor and other electrically coupled components that remain powered in the unpowered state.

15. The electronic overload relay of claim 10, wherein the initial value is decremented to compensate for cooling of a protected motor during the unpowered state, the protected motor being communicatively coupled to the processor.

16. A computer program product, comprising a non-transitory computer readable medium having computer executable program code stored thereon, the computer executable program code being configured to be executed by a processor to implement a method for protecting a motor with an electronic overload relay, the overload relay including a power supply with a capacitor and a microcontroller having a volatile memory, the method comprising:
monitoring a supply voltage to the capacitor during a first powered state of the motor;
storing an initial thermal value of a motor thermal model and an initial capacitor voltage;
in response to the motor entering an unpowered state, discontinuing the monitoring of the supply voltage to the capacitor; and
in response to the motor entering a second powered state, subsequent to the unpowered state,
determining (a) a change in capacitor voltage between the first powered state and the second powered state and (b) a discharge rate of the capacitor,
calculating duration of the unpowered state based on the change in capacitor voltage and on the discharge rate of the capacitor, and
adjusting the initial thermal value to a modified thermal value based on the duration.

17. The computer program product of claim 16, wherein the volatile memory is internal memory of the microcontroller.

18. The computer program product of claim 16, wherein, in the unpowered state, the microcontroller enters a low power operating mode and discontinues processing any instructions.

19. The computer program product of claim 16, wherein the discharge rate of the capacitor is defined at least in part by (i) internal leakage current of the capacitor and (ii) quiescent currents of the microcontroller.

20. The computer program product of claim 16, wherein the discharge rate of the capacitor is constant.

* * * * *